(12) United States Patent
Ryuzaki et al.

(10) Patent No.: US 10,876,583 B2
(45) Date of Patent: Dec. 29, 2020

(54) CLUTCH CONTROL DEVICE AND CLUTCH CONTROL SYSTEM

(71) Applicant: HONDA MOTOR CO., LTD., Tokyo (JP)

(72) Inventors: Tatsuya Ryuzaki, Wako (JP); Go Morita, Wako (JP); Junya Ono, Wako (JP); Kohei Matsuura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 20 days.

(21) Appl. No.: 16/223,243

(22) Filed: Dec. 18, 2018

(65) Prior Publication Data

US 2019/0203782 A1    Jul. 4, 2019

(30) Foreign Application Priority Data

Dec. 28, 2017 (JP) .................. 2017-254247

(51) Int. Cl.
*F16D 48/06* (2006.01)

(52) U.S. Cl.
CPC ........ *F16D 48/06* (2013.01); *F16D 2500/104* (2013.01); *F16D 2500/1117* (2013.01); *F16D 2500/306* (2013.01); *F16D 2500/3065* (2013.01); *F16D 2500/3067* (2013.01); *F16D 2500/30806* (2013.01);
(Continued)

(58) Field of Classification Search
CPC .... F16H 59/14; F16H 2059/147; F16D 48/06; F16D 2500/3065; F16D 2500/3067; F16D 2500/70426; F16D 2500/70605
See application file for complete search history.

(56) References Cited

U.S. PATENT DOCUMENTS

| 5,766,110 A * | 6/1998 | Kanno | ................. F16D 48/066 477/175 |
| 6,565,483 B2 * | 5/2003 | Segawa | ................. F16H 61/143 477/174 |

(Continued)

FOREIGN PATENT DOCUMENTS

| CN | 105074290 | 11/2015 |
| DE | 102012007622 | 10/2013 |

(Continued)

OTHER PUBLICATIONS

Extended European Search Report for European Patent Application No. 18213793.5 dated Jun. 13, 2019.

(Continued)

*Primary Examiner* — David R Morris
(74) *Attorney, Agent, or Firm* — Amin, Turocy & Watson, LLP

(57) ABSTRACT

A clutch control device includes an engine, a gearbox, a clutch device configured to disconnect and connect power transmission between the engine and the gearbox, a clutch actuator configured to drive the clutch device and vary a clutch capacity, an engine rotational number sensor configured to detect an engine rotational number, a throttle opening angle sensor configured to detect a throttle opening angle, and a controller configured to calculate a control target value of the clutch capacity, wherein the controller calculates an estimated engine torque and causes the clutch device to change a slip clutch capacity according to the estimated engine torque.

9 Claims, 10 Drawing Sheets

(52) U.S. Cl.
CPC ............... *F16D 2500/314* (2013.01); *F16D 2500/3124* (2013.01); *F16D 2500/50287* (2013.01); *F16D 2500/70252* (2013.01); *F16D 2500/70426* (2013.01); *F16D 2500/70436* (2013.01); *F16D 2500/70442* (2013.01); *F16D 2500/70458* (2013.01); *F16D 2500/70605* (2013.01); *F16D 2500/70631* (2013.01); *F16D 2500/7108* (2013.01)

(56) References Cited

U.S. PATENT DOCUMENTS

| | | | | |
|---|---|---|---|---|
| 8,337,363 | B2* | 12/2012 | Minami | B62M 7/02 477/180 |
| 8,977,458 | B2* | 3/2015 | Nedachi | F16D 21/02 192/3.51 |
| 2002/0077218 | A1* | 6/2002 | Segawa | F16H 61/143 477/176 |
| 2009/0270224 | A1* | 10/2009 | Minami | F16D 48/06 477/101 |
| 2014/0095040 | A1 | 4/2014 | Nedachi et al. | |
| 2019/0162253 | A1* | 5/2019 | Matsuura | F16D 48/064 |
| 2019/0203783 | A1* | 7/2019 | Ryuzaki | F16D 48/066 |

FOREIGN PATENT DOCUMENTS

| | | |
|---|---|---|
| EP | 1217264 | 6/2002 |
| EP | 2042768 | 4/2009 |
| EP | 2112392 | 10/2009 |
| JP | 2007-170441 | 7/2007 |
| JP | 2015-078764 | 4/2015 |
| JP | 2016-145626 | 8/2016 |

OTHER PUBLICATIONS

Chinese Office Action for Chinese Patent Application No. 201811596864.9 dated Apr. 2, 2020.

European Office Action for European Patent Application No. 18213793.5 dated Sep. 17, 2020.

Japanese Office Action for Japanese Patent Application No. 2017-254247 dated Nov. 4, 2020.

\* cited by examiner

FIG. 8

ENGINE ROTATIONAL NUMBER[rpm]

| | r1 | r2 | r3 | r4 | r5 | r6 | r7 | r8 | r9 | r10 |
|---|---|---|---|---|---|---|---|---|---|---|
| t1 | -q1 | -q2 | -q3 | -q4 | -q5 | -q6 | -q7 | -q8 | -q9 | -q10 |
| t2 | q1 | q1 | -q2 | -q3 | -q4 | -q5 | -q6 | -q7 | -q8 | -q9 |
| t3 | q2 | q2 | q1 | -q2 | -q3 | -q4 | -q5 | -q6 | -q7 | -q8 |
| t4 | q3 | q3 | q2 | q1 | q1 | -q3 | -q4 | -q5 | -q6 | -q7 |
| t5 | q4 | q4 | q3 | q2 | q2 | q1 | q1 | q1 | -q5 | -q6 |
| t6 | q5 | q5 | q4 | q3 | q3 | q2 | q2 | q2 | q1 | q1 |
| t7 | q6 | q6 | q5 | q4 | q4 | q3 | q3 | q3 | q2 | q2 |
| t8 | q7 | q7 | q6 | q5 | q5 | q4 | q4 | q4 | q3 | q3 |
| t9 | q8 | q8 | q7 | q6 | q6 | q5 | q5 | q5 | q4 | q4 |
| t10 | q9 | q9 | q8 | q7 | q7 | q6 | q6 | q6 | q5 | q5 |

THROTTLE OPENING ANGLE[%]

FIG. 9A
AT LOW GEAR    CLUTCH DIFFERENTIAL ROTATIONAL NUMBER [rpm]

BANK ANGLE [°]

| | v1 | v2 | v3 | v4 |
|---|---|---|---|---|
| b1 | UPPER LIMIT HYDRAULIC PRESSURE: HIGH | | | |
| b2 | | UPPER LIMIT HYDRAULIC PRESSURE: MIDDLE | | |
| b3 | | | | |
| b4 | | | | |
| b5 | | | | |
| b6 | | UPPER LIMIT HYDRAULIC PRESSURE: LOW | | |
| b7 | | | | |
| b8 | | | | |

FIG. 9B
AT MID GEAR    CLUTCH DIFFERENTIAL ROTATIONAL NUMBER [rpm]

BANK ANGLE [°]

| | v1 | v2 | v3 | v4 |
|---|---|---|---|---|
| b1 | UPPER LIMIT HYDRAULIC PRESSURE: HIGH | | | |
| b2 | | | | |
| b3 | | UPPER LIMIT HYDRAULIC PRESSURE: MIDDLE | | |
| b4 | | | | |
| b5 | | | | |
| b6 | | | | |
| b7 | | UPPER LIMIT HYDRAULIC PRESSURE: LOW | | |
| b8 | | | | |

FIG. 9C
AT HIGH GEAR    CLUTCH DIFFERENTIAL ROTATIONAL NUMBER [rpm]

BANK ANGLE [°]

| | v1 | v2 | v3 | v4 |
|---|---|---|---|---|
| b1 | UPPER LIMIT HYDRAULIC PRESSURE: HIGH | | | |
| b2 | | | | |
| b3 | | | | |
| b4 | | UPPER LIMIT HYDRAULIC PRESSURE: MIDDLE | | |
| b5 | | | | |
| b6 | | | | |
| b7 | | | | |
| b8 | | UPPER LIMIT HYDRAULIC PRESSURE: LOW | | | ced
CLUTCH CONTROL DEVICE AND CLUTCH CONTROL SYSTEM

CROSS-REFERENCE TO RELATED APPLICATION

Priority is claimed on Japanese Patent Application No. 2017-254247, filed Dec. 28, 2017, the content of which is incorporated herein by reference.

BACKGROUND OF THE INVENTION

Field of the Invention

The present invention relates to a clutch control device and a clutch control system.

Description of Related Art

In the related art, in a clutch device installed in a torque transmission route between an engine and a wheel, a configuration including a slipper cam mechanism configured to release a back torque using movement of a clutch center in an axial direction is known (for example, see Japanese Unexamined Patent Application, First Publication No. 2016-145626).

The clutch device in Japanese Unexamined Patent Application, First Publication No. 2016-145626 includes a plunger mechanism engaged with a washer member until a rotational number of the clutch center reaches a threshold value and configured to restrict movement of the clutch center in the axial direction, and operated by a centrifugal force to release the engagement when the rotational number of the clutch center exceeds the threshold value.

That is, Japanese Unexamined Patent Application, First Publication No. 2016-145626 discloses a mechanical type slipper clutch in which a clutch capacity is decreased when the rotational number reaches a predetermined rotational number. The mechanical type slipper clutch of the related art includes only a mechanism configured to decrease a clutch capacity in a connection state (operated in a disconnection direction) when the vehicle speed and the engine rotational number satisfy one predetermined condition.

SUMMARY OF THE INVENTION

Incidentally, a timing when a clutch capacity is decreased differs due to a bank angle or the like of a vehicle body (a state of a vehicle). However, in a mechanical type slipper clutch of the related art, since a clutch capacity cannot be freely varied according to the state of the vehicle, an optimal clutch capacity cannot be output.

In particular, when an engine rotational number with respect to a vehicle speed is low, while a friction torque of an engine (a force applied in a direction in which the engine rotational number is decreased) also decreases. However, since the mechanical type slipper clutch of the related art has a clutch capacity that is constant during slippage when a back torque is input, and therefore, a difference between a friction torque of the engine and a torque transmitted from a rear wheel through a clutch is increased. As a result, the friction torque of the engine is increased and a vehicle speed is decreased as the engine rotational number is increased according to the vehicle speed. That is, engine braking is abruptly generated. With respect to this, in order to maintain an engine rotational number constantly for maintaining the vehicle speed, it is necessary to appropriately adjust the clutch operation.

An aspect of the present invention is directed to outputting an optimal clutch capacity in a clutch control device and a clutch control system.

(1) A clutch control device according to an aspect of the present invention includes an engine; a gearbox; a clutch device configured to disconnect and connect power transmission between the engine and the gearbox; a clutch actuator configured to drive the clutch device and vary a clutch capacity; an engine rotational number sensor configured to detect an engine rotational number; a throttle opening angle sensor configured to detect a throttle opening angle; and a controller configured to calculate a control target value of the clutch capacity, wherein the controller calculates an estimated engine torque and causes the clutch device to change a slip clutch capacity according to the estimated engine torque.

(2) In the aspect of above mentioned (1), the controller may set a clutch capacity according to a state of a vehicle as the control target value when the estimated engine torque is less than a predetermined value.

(3) In the aspect of above mentioned (1) or (2), the controller may set a clutch capacity according to a state of a vehicle as the control target value when a clutch differential rotational number, which is a rotational number difference between upstream rotation and downstream rotation of the clutch device, exceeds a predetermined value.

(4) In the aspect of any one of above mentioned (1) to (3), the controller may calculate a clutch differential rotational number which is a rotational number difference between upstream rotation and downstream rotation of the clutch device, and output the control target value that differs according to the clutch differential rotational number.

(5) In the aspect of any one of above mentioned (1) to (4), the clutch control device may further include a bank angle sensor configured to detect a bank angle, wherein the controller may output the control target value that differs according to the bank angle.

(6) In the aspect of any one of above mentioned (1) to (5), the clutch control device may further include a gear position sensor configured to detect a gear position, wherein the controller may output the control target value that differs according to the gear position.

(7) In the aspect of above mentioned (4), the clutch control device may further include a storage that stores a control target value map in which the control target value that differs according to the clutch differential rotational number is set, wherein the controller may output the control target value on the basis of the clutch differential rotational number and the control target value map.

(8) In the aspect of above mentioned (5), the clutch control device may further include a storage that stores a control target value map in which the control target value that differs according to the bank angle is set, wherein the controller may output the control target value on the basis of the bank angle and the control target value map.

(9) In the aspect of above mentioned (6), the clutch control device may further include a storage that stores a control target value map in which the control target value that differs according to the gear position is set, wherein the controller may output the control target value on the basis of the gear position and the control target value map.

(10) A clutch control system according to another aspect of the present invention includes the clutch control device according to the aspect of any one of above mentioned (1)

to (9); and a clutch operator configured to manually operate the clutch device, the clutch control system being switchable between to generate a clutch capacity according to an operation amount of the clutch operator and to designate a clutch capacity by using the controller, wherein, when an engine torque and a clutch differential rotational number, which is a rotational number difference between upstream rotation and downstream rotation of the clutch device, satisfy a predetermined condition, in a case in which a clutch capacity according to the operation amount exceeds a predetermined value, the clutch capacity designated by the controller is preferentially output.

According to the aspect of above mentioned (1), as the controller calculates an estimated engine torque and causes the clutch device to vary a slip clutch capacity according to the estimated engine torque, since the clutch capacity at which the clutch starts to slip can be freely varied according to the estimated engine torque, an optimal clutch capacity can be output.

According to the aspect of above mentioned (2), since the controller sets the clutch capacity according to the state of the vehicle as the control target value when the estimated engine torque is less than the predetermined value, a timing when an optimal clutch capacity is output can be restricted to when the estimated engine torque is less than the predetermined value.

According to the aspect of above mentioned (3), since the controller sets the clutch capacity according to the state of the vehicle as the control target value when the clutch differential rotational number exceeds the predetermined value, a timing when an optimal clutch capacity is output can be restricted to a case in which the clutch differential rotational number exceeds the predetermined value.

According to the aspect of above mentioned (4), since the controller can freely vary the clutch capacity according to the clutch differential rotational number by calculating the clutch differential rotational number and outputting the control target value that differs according to the clutch differential rotational number, an optimal clutch capacity can be output.

According to the aspect of above mentioned (5), as the controller outputs the control target value that differs according to the bank angle, since the clutch capacity can be freely varied according to a magnitude of the bank angle, an optimal clutch capacity can be output.

According to the aspect of above mentioned (6), as the controller outputs the control target value that differs according to the gear position, since the clutch capacity can be freely varied according to the gear position, an optimal clutch capacity can be output.

According to the aspect of above mentioned (7), as the controller outputs the control target value on the basis of the clutch differential rotational number and the control target value map, since the control target value (the control target value according to the clutch differential rotational number) preset in the control target value map can be used as the clutch capacity, an optimal clutch capacity can be more stably output.

According to the aspect of above mentioned (8), as the controller outputs the control target value on the basis of the bank angle and the control target value map, the control target value (the control target value according to the bank angle) preset in the control target value map can be used as the clutch capacity, an optimal clutch capacity can be more stably output.

According to the aspect of above mentioned (9), as the controller outputs the control target value on the basis of the gear position and the control target value map, since the control target value (the control target value according to the gear position) preset in the control target value map can be used as the clutch capacity, an optimal clutch capacity can be more stably output.

According to the aspect of above mentioned (10), in the case in which the clutch capacity according to the operation amount exceeds the predetermined value when the engine torque and the clutch differential rotational number satisfy the predetermined condition, since the clutch capacity designated by the controller is preferentially output, even when intervention of the manual clutch operation by the clutch operator is possible, an optimal clutch capacity can be output by the controller.

BRIEF DESCRIPTION OF THE DRAWINGS

FIG. 8 is a view showing an estimated engine torque map according to the embodiment.

FIG. 9A is a view showing correlations between a clutch differential rotational number, a bank angle and an upper limit hydraulic pressure according to the embodiment in a LOW gear.

FIG. 9B is a view showing correlations between a clutch differential rotational number, a bank angle and an upper limit hydraulic pressure according to the embodiment in a MID gear.

FIG. 9C is a view showing correlations between a clutch differential rotational number, a bank angle and an upper limit hydraulic pressure according to the embodiment in a HIGH gear.

DETAILED DESCRIPTION OF THE INVENTION

Figure 1:
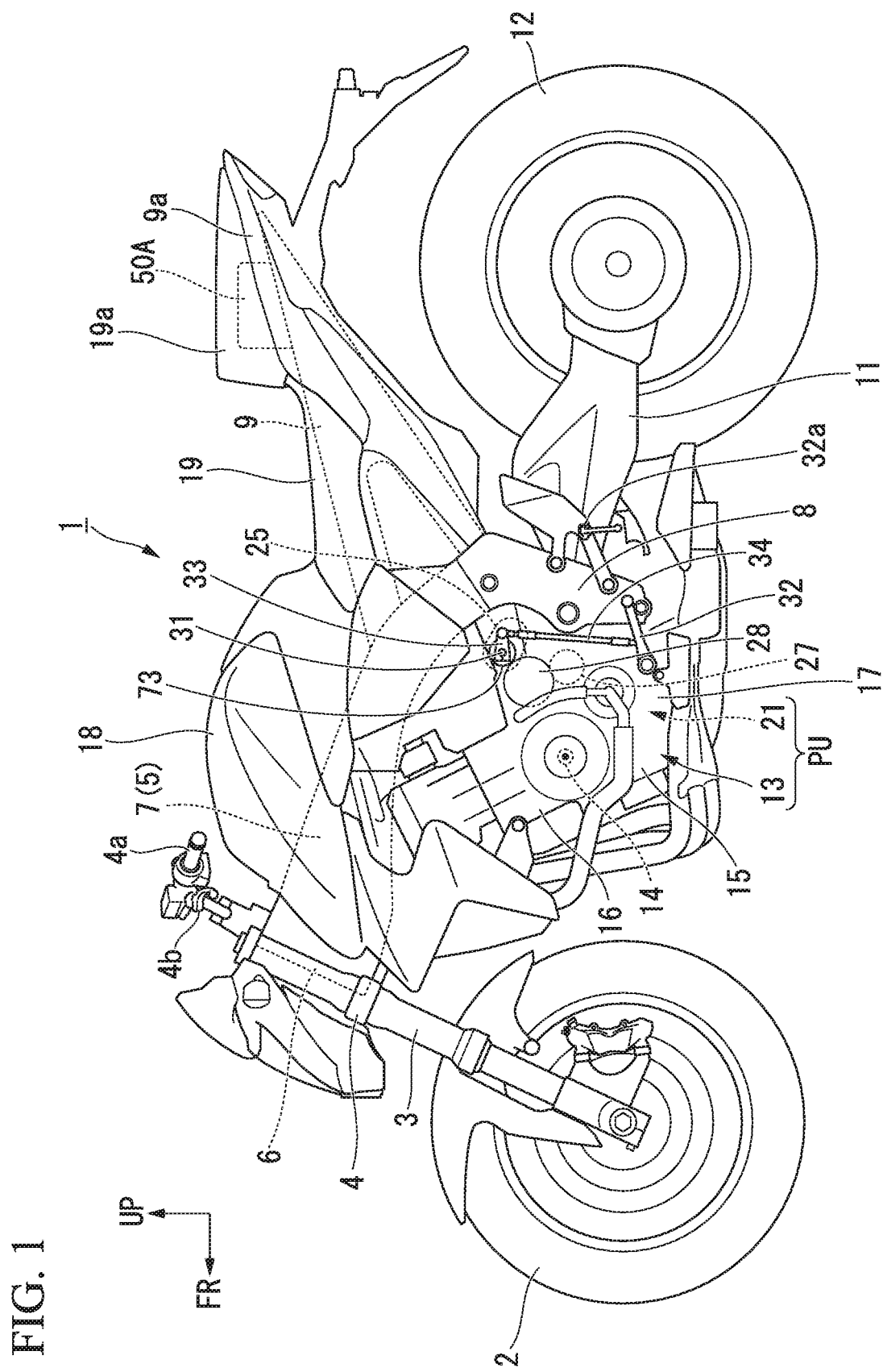
FIG. 1 is a left side view of a motorcycle according to an embodiment.

Hereinafter, an embodiment of the present invention will be described with reference to the accompanying drawings. Further, directions of forward, rearward, leftward, rightward, and so on, in the following description are the same as directions in a vehicle described below unless the context clearly indicates otherwise. In addition, in appropriate places in the drawings used in the following description, an arrow FR indicates a forward direction with respect to a vehicle, an arrow LH indicates a leftward direction with respect to the vehicle, and an arrow UP indicates an upward direction with respect to the vehicle.

<Entire Vehicle>

As shown in FIG. 1, the embodiment is applied to a motorcycle 1 that is a saddle riding vehicle. A front wheel 2 of the motorcycle 1 is supported by lower end portions of a pair of left and right front forks 3.

Upper sections of the left and right front forks 3 are supported by a head pipe 6, which is a front end portion of a vehicle body frame 5, via a steering stem 4. A bar type steering handle 4a is attached onto a top bridge of the steering stem 4.

The vehicle body frame 5 includes the head pipe 6, main tubes 7 extending downward and rearward from the head pipe 6 at a center in a vehicle width direction (a leftward and rightward direction), left and right pivot frames 8 that are connected to the lower sides of rear end portions of the main tubes 7, and a seat frame 9 that is connected to rear sides of the main tubes 7 and the left and right pivot frames 8. A front end portion of a swing arm 11 is swingably supported by the left and right pivot frames 8. A rear wheel 12 of the motorcycle 1 is supported by a rear end portion of the swing arm 11.

A fuel tank 18 is supported above the left and right main tubes 7. A front seat 19 and a rear seat cover 19a that are arranged in a forward and rearward direction are supported behind the fuel tank 18 and above the seat frame 9. The surroundings of the seat frame 9 are covered with a rear cowl 9a.

A power unit PU that is a prime mover of the motorcycle 1 is suspended below the left and right main tubes 7. For example, the power unit PU is linked to the rear wheel 12 via a chain type transmission mechanism.

The power unit PU integrally has a gearbox 21 disposed at a rear side thereof and an engine (an internal combustion engine) 13 disposed at a front side thereof. The engine 13 is, for example, a multiple-cylinder engine in which a rotation axis of a crankshaft 14 (hereinafter, also referred to as "a crankshaft 14") is in the leftward and rightward direction (the vehicle width direction). In the engine 13, a cylinder 16 stands up at a front upper side of a crankcase 15. A rear section of the crankcase 15 is made as a gearbox case 17 that accommodates the gearbox 21.

<Gearbox>

Figure 2:
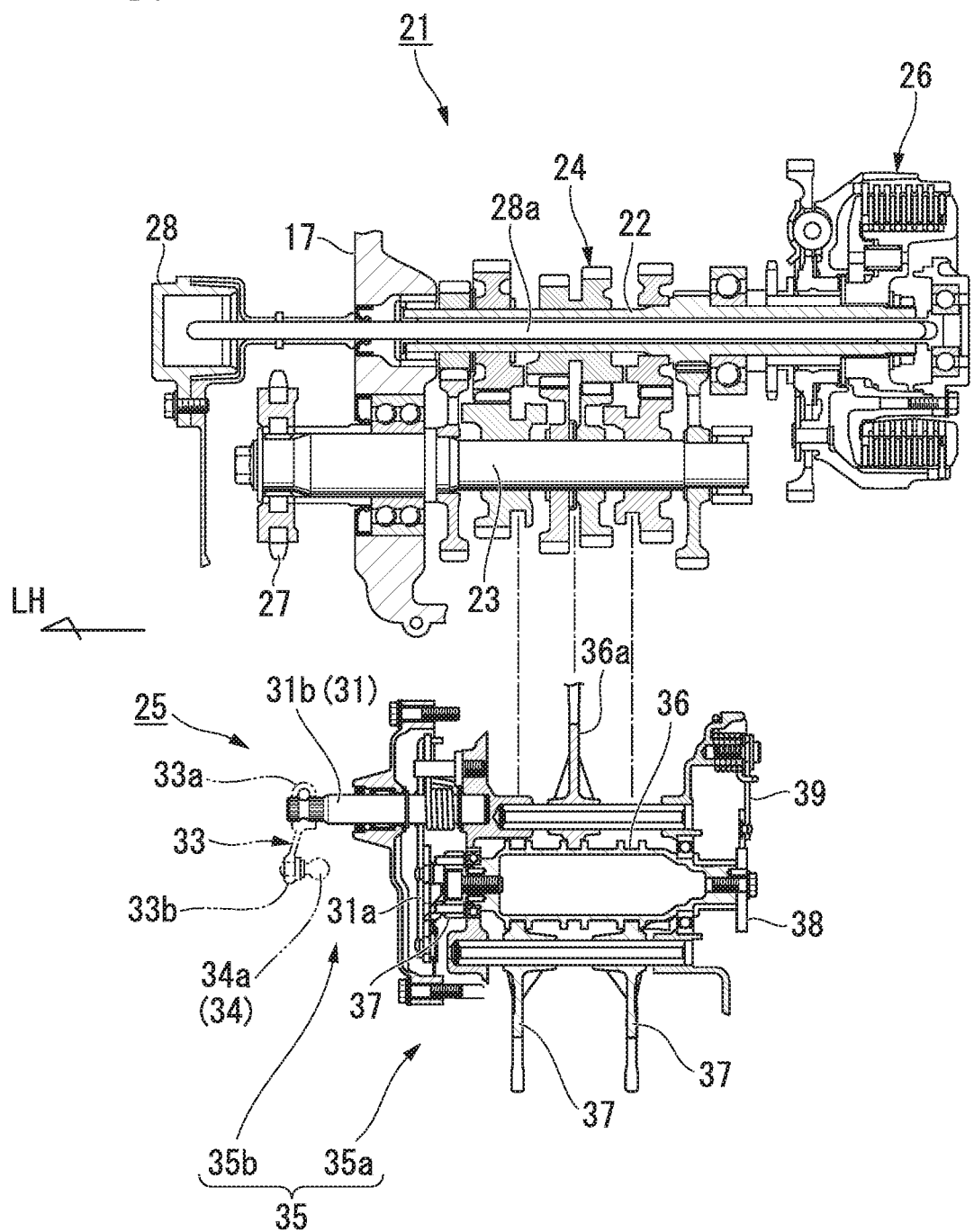
FIG. 2 is a cross-sectional view of a gearbox and a change mechanism of the motorcycle according to the embodiment.

As shown in FIG. 2, the gearbox 21 is a stepped transmission having a main shaft 22, a counter shaft 23, and a shifting gear group 24 that bridges between both of the shafts 22 and 23. The counter shaft 23 (hereinafter, also referred to as "the countershaft 23") constitutes output shafts of the gearbox 21 and the power unit PU. An end portion of the counter shaft 23 protrudes leftward from a rear left side of the crankcase 15, and is connected to the rear wheel 12 via the chain type transmission mechanism.

The shifting gear group 24 has gears corresponding to the number of variable speed levels supported by the shafts 22 and 23. The gearbox 21 is of a constant mesh type in which gear pairs to which the shifting gear group 24 corresponds are normally meshed between the shafts 22 and 23. A plurality of gears supported by the shafts 22 and 23 are classified into a free gear that is rotatable with respect to a corresponding shaft, and a slide gear (a shifter) spline-fitted to a corresponding shaft. A convex dog is formed on one of the free gear and the slide gear in an axial direction, and a concave slot is formed in the other gear in the axial direction such that the dog is engaged with the slot. That is, the gearbox 21 is a so-called dog mission.

Referring also to FIG. 1, the main shaft 22 and the counter shaft 23 of the gearbox 21 are disposed to be arranged behind the crankshaft 14 in the forward and rearward direction. A clutch device 26 operated by a clutch actuator 50 is disposed at a right end portion of the main shaft 22 while being coaxial with the main shaft 22. The clutch device 26 is, for example, a wet multiplate clutch that is a so-called normally open clutch. That is, the clutch device 26 is in a connection state in which power transmission is possible due to supply of a hydraulic pressure from the clutch actuator 50, and returns to a disconnection state in which power transmission is not possible when there is no supply of a hydraulic pressure from the clutch actuator 50.

Referring to FIG. 2, the rotary power of the crankshaft 14 is transmitted to the main shaft 22 via the clutch device 26, and transmitted from the main shaft 22 to the counter shaft 23 via an arbitrary gear pair of the shifting gear group 24. A drive sprocket 27 of the chain type transmission mechanism is attached to a left end portion of the counter shaft 23 protruding toward a rear left side of the crankcase 15.

A change mechanism 25 configured to switch a gear pair of the shifting gear group 24 is accommodated in the gearbox 21 on a rear upper side thereof. The change mechanism 25 operates a plurality of shift forks 36a according to a pattern of lead grooves formed in an outer circumference thereof due to rotation of a hollow cylindrical shift drum 36 parallel to both of the shafts 22 and 23, and switches a gear pair of the shifting gear group 24 used for power transmission between the shafts 22 and 23.

The change mechanism 25 has a shift spindle 31 parallel to the shift drum 36.

Upon rotation of the shift spindle 31, a shift arm 31a fixed to the shift spindle 31 rotates the shift drum 36 and moves the shift forks 36a according to a pattern of the lead grooves in the axial direction, and the change mechanism 25 switches a gear pair that enables power transmission in the shifting gear group 24 (i.e., a variable speed level is switched).

The shift spindle 31 has a shaft outer portion 31b protruding outward (leftward) from the crankcase 15 in the vehicle width direction such that the change mechanism 25 is operable. A shift load sensor 73 (a shift operation detection means) is attached to the shaft outer portion 31b of the shift spindle 31 (see FIG. 1) so as to be coaxial with the shift spindle 31. A swing lever 33 is attached to the shaft outer portion 31b of the shift spindle 31 (or a rotation axis of the shift load sensor 73). The swing lever 33 extends rearward from a base end portion 33a fixed to the shift spindle 31 (or a rotation axis) using a clamp, and an upper end portion of a link rod 34 is swingably connected to a tip portion 33b of the swing lever 33 via an upper ball joint 34a. A lower end portion of the link rod 34 is swingably connected to a shift pedal 32 that is operated by a driver's foot via a lower ball joint (not shown).

As shown in FIG. 1, the shift pedal 32 has a front end portion that is vertically swingably supported by a lower section of the crankcase 15 via a shaft in the leftward and rightward direction. A pedal section on which a tip of a driver's foot placed on a step 32a is put is installed on a rear end portion of the shift pedal 32, and a lower end portion of the link rod 34 is connected to an intermediate section of the shift pedal 32 in the forward and rearward direction.

As shown in FIG. 2, a shift change apparatus 35 including the shift pedal 32, the link rod 34 and the change mechanism 25 and configured to switch a variable speed level gear of the gearbox 21 is provided. In the shift change apparatus 35, an assembly (the shift drum 36, the shift forks 36a, and so on) configured to switch a variable speed level of the gearbox 21 in the gearbox case 17 is referred to as a gear shift operation section 35a, and the assembly (the shift spindle 31, the shift arm 31a, and so on) into which a gear shift operation to the shift pedal 32 is input and configured to rotate about an axis of the shift spindle 31 and transmit the rotation to the gear shift operation section 35a is referred to as a gear shift operation receiving part 35b.

Here, the motorcycle 1 employs a so-called semi-automatic gear shift system (an automatic clutch type gear shift system) in which a driver performs only a gear shift operation of the gearbox 21 (a foot operation of the shift pedal 32), and a disconnection and connection operation of the clutch device 26 is automatically performed through electric control according to an operation of the shift pedal 32.

<Gear Shift System>

Figure 4:
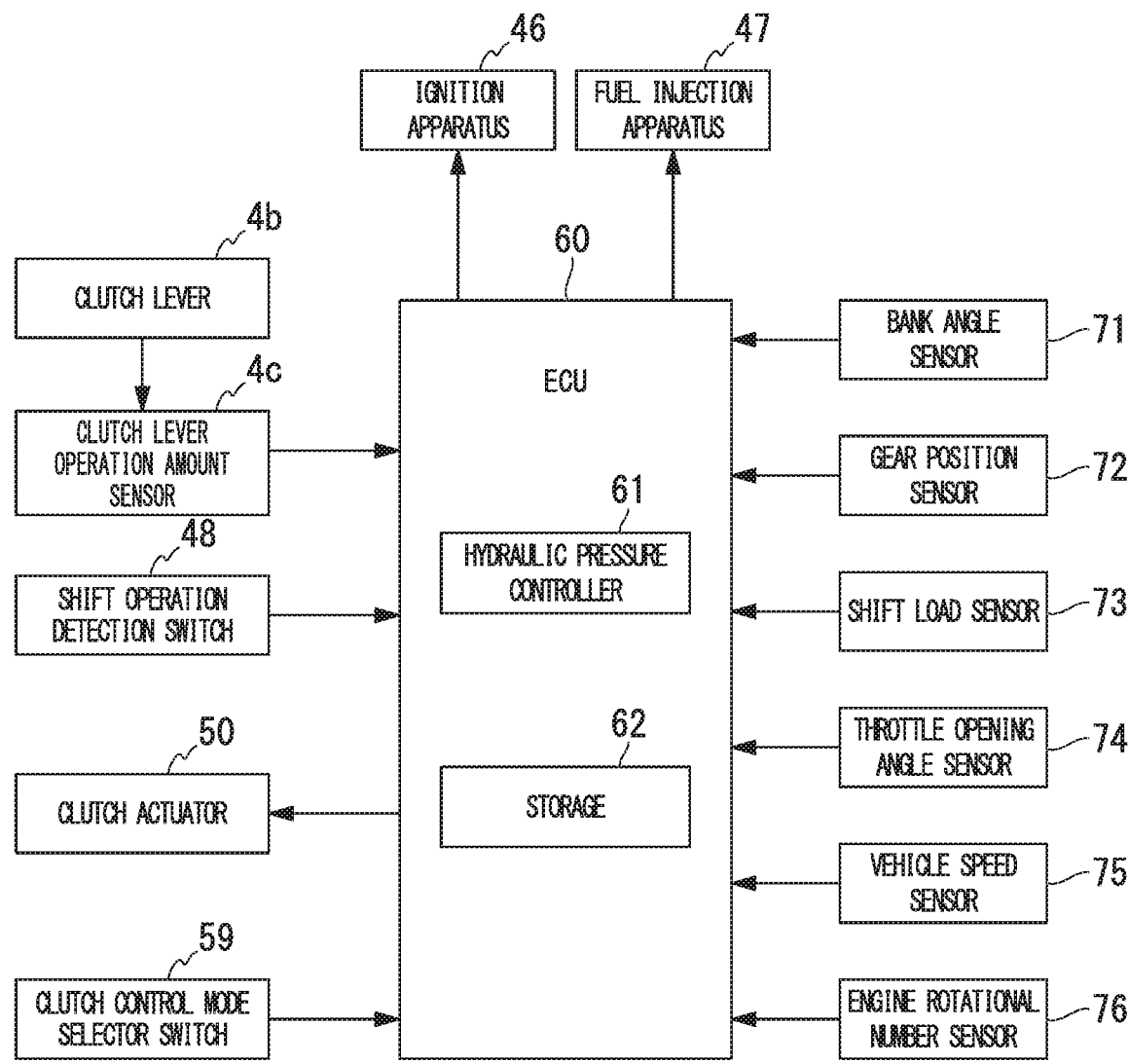
FIG. 4 is a block diagram of a gear shift system.

As shown in FIG. 4, the gear shift system includes the clutch actuator 50, an electronic control unit 60 (ECU, a control device) and various sensors 71 to 76.

The ECU 60 controls operations of an ignition apparatus 46 and a fuel injection apparatus 47 while controlling an operation of the clutch actuator 50 on the basis of detection information from a bank angle sensor 71 configured to detect a bank angle of a vehicle body, a gear position sensor 72 configured to detect a variable speed level from a rotation angle of the shift drum 36, and the shift load sensor 73 (for example, a torque sensor) configured to detect an operation torque input to the shift spindle 31, and various types of vehicle state detection information or the like from a throttle opening angle sensor 74 configured to detect a throttle opening angle, a vehicle speed sensor 75, an engine rotational number sensor 76 configured to detect an engine rotational number, and so on. Detection information from hydraulic pressure sensors 57 and 58, and a shift operation detection switch (a shift neutral switch) 48, which will be described below, is input to the ECU 60.

In addition, the ECU 60 includes a hydraulic pressure controller (a clutch controller) 61 and a storage 62, functions of which will be described below.

Figure 3:
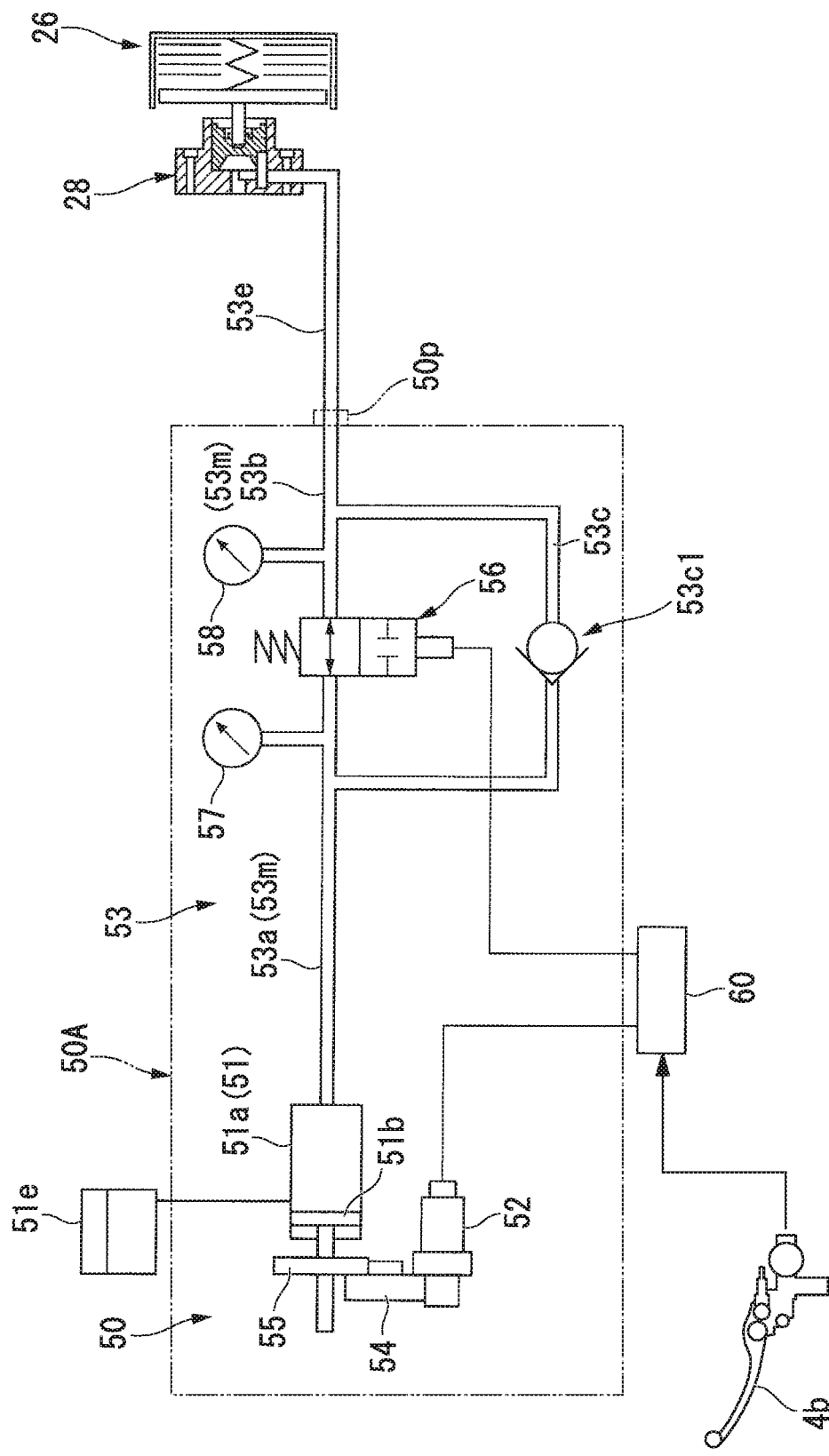
FIG. 3 is a view schematically explaining a clutch operation system including a clutch actuator.

Referring also to FIG. 3, the clutch actuator 50 can control a hydraulic pressure that disconnects and connects the clutch device 26 by controlling an operation thereof using the ECU 60. The clutch actuator 50 includes an electric motor 52 (hereinafter, simply referred to as the motor 52) serving as a drive source, and a master cylinder 51 driven by the motor 52. The clutch actuator 50 constitutes an integrated clutch controller 50A together with a hydraulic pressure circuit apparatus 53 installed between the master cylinder 51 and a hydraulic pressure supply and discharge port 50p.

The ECU 60 calculates a target value (a target hydraulic pressure) of a hydraulic pressure supplied to a slave cylinder 28 for disconnecting and connecting the clutch device 26 on the basis of a preset calculation program, and controls the clutch controller 50A such that a hydraulic pressure (a slave hydraulic pressure) on the side of the slave cylinder 28 detected by the downstream-side hydraulic pressure sensor 58 approaches a target hydraulic pressure.

The master cylinder 51 can stroke a piston 51b in a cylinder main body 51a through driving of the motor 52, and supply and discharge working oil in the cylinder main body 51a to and from the slave cylinder 28. Reference numeral 55 in the drawings designates a ball screw mechanism serving as a conversion mechanism, reference numeral 54 designates a transmission mechanism that bridges between the motor 52 and the conversion mechanism 55, and reference numeral 51e designates a reservoir connected to the master cylinder 51.

The hydraulic pressure circuit apparatus 53 has a valve mechanism (a solenoid valve 56) configured to open or block an intermediate area of a main oil path (a hydraulic pressure supply and discharge oil path) 53m extending from the master cylinder 51 toward the clutch device 26 (the slave cylinder 28). The main oil path 53m of the hydraulic pressure circuit apparatus 53 is divided into an upstream side oil path 53a which is on the master cylinder 51 side of the solenoid valve 56 and a downstream side oil path 53b which is on the slave cylinder 28 side of the solenoid valve 56. The hydraulic pressure circuit apparatus 53 further includes a bypass oil path 53c configured to bypass the solenoid valve 56 and to communicate the upstream side oil path 53a and the downstream side oil path 53b with each other.

The solenoid valve 56 is a so-called normal open valve. A one-way valve 53c1 configured to allow working oil to flow only in a direction from an upstream side to a downstream side is installed in the bypass oil path 53c. The upstream-side hydraulic pressure sensor 57 configured to detect a hydraulic pressure of the upstream side oil path 53a is installed upstream from the solenoid valve 56. The downstream-side hydraulic pressure sensor 58 configured to detect a hydraulic pressure of the downstream side oil path 53b is installed downstream from the solenoid valve 56.

As shown in FIG. 1, the clutch controller 50A is accommodated in, for example, the rear cowl 9a. The slave cylinder 28 is attached to a rear left side of the crankcase 15. The clutch controller 50A and the slave cylinder 28 are connected to each other via a hydraulic pressure pipeline 53e (see FIG. 3).

As shown in FIG. 2, the slave cylinder 28 is disposed coaxially with the main shaft 22 on a left side thereof. The slave cylinder 28 presses a push rod 28a passing through the main shaft 22 rightward when a hydraulic pressure from the clutch actuator 50 is supplied. The slave cylinder 28 operates the clutch device 26 via the push rod 28a by pressing the push rod 28a rightward such that the clutch device 26 is brought into a connection state. The slave cylinder 28 releases pressing of the push rod 28a and returns the clutch device 26 to a disconnection state when there is no supply of hydraulic pressure.

While a hydraulic pressure needs to be continuously supplied to maintain the clutch device 26 in a connection state, electric power is correspondingly consumed. Here, as shown in FIG. 3, the solenoid valve 56 is installed in the hydraulic pressure circuit apparatus 53 of the clutch controller 50A, and the solenoid valve 56 is closed after supply of a hydraulic pressure toward the clutch device 26. Accordingly, energy consumption is minimized by a configuration of maintaining a hydraulic pressure supplied toward the clutch device 26 and supplementing the hydraulic pressure according to decrease in pressure (restoring a pressure according to an amount of leakage).

<Clutch Control>

Figure 5:
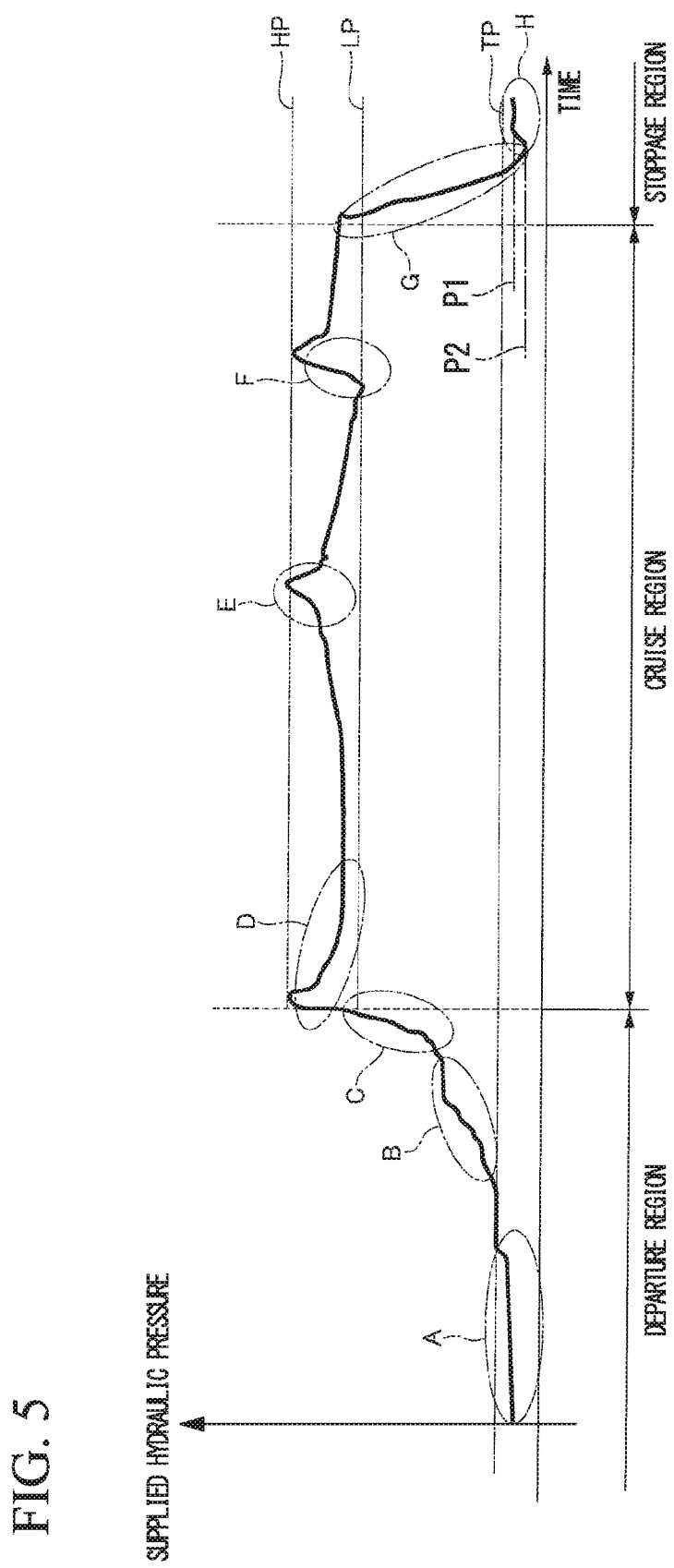
FIG. 5 is a graph showing variation of a supplied hydraulic pressure of a clutch actuator.

Next, an action of a clutch control system will be described with reference to a graph of FIG. 5. In the graph of FIG. 5, a vertical axis represents a supplied hydraulic pressure detected by the downstream-side hydraulic pressure sensor 58, and a horizontal axis represents an elapsed time.

Upon stoppage (upon idling) of the motorcycle 1, the solenoid valve 56 controlled by the ECU 60 is in a valve open state. Here, the slave cylinder 28 side (a downstream side) is in a state of having a pressure lower than a touch point hydraulic pressure TP, and the clutch device 26 is in a disengaged state (a disconnection state, a release state). This state corresponds to a region A in FIG. 5.

In a state in which the vehicle is stopped in an in-gear state, electric power is supplied to the motor 52, and a hydraulic pressure is slightly generated. This is because the clutch is continuously connected and the vehicle can depart immediately.

Upon departure of the motorcycle 1, when a rotational number of the engine 13 is increased, electric power is supplied only to the motor 52, and a hydraulic pressure is supplied from the master cylinder 51 to the slave cylinder 28 via the solenoid valve 56 in an open state. When a hydraulic pressure on a side of the slave cylinder 28 (a downstream side) is increased to the touch point hydraulic pressure TP or more, engagement of the clutch device 26 is started, and the clutch device 26 is in a half clutch state in which some of power can be transmitted. Accordingly, smooth departure of the motorcycle 1 becomes possible. This state corresponds to a region B in FIG. 5.

Then, when a difference between input rotation and output rotation of the clutch device 26 is reduced and a hydraulic pressure on a side of the slave cylinder 28 (the downstream side) reaches a lower limit holding hydraulic pressure LP, engagement of the clutch device 26 is shifted to a locked state, and a driving force of the engine 13 is entirely transmitted to the gearbox 21. This state corresponds to a region C in FIG. 5.

When a hydraulic pressure is supplied from the master cylinder 51 side toward the slave cylinder 28, the solenoid valve 56 is in an open state, the motor 52 is energized to drive in a normal rotation direction, and the master cylinder 51 is pressurized. Accordingly, a hydraulic pressure on a side of the slave cylinder 28 is adjusted to a clutch-engagement hydraulic pressure. Here, driving of the clutch actuator 50 is feedback-controlled on the basis of a detected hydraulic pressure of the downstream-side hydraulic pressure sensor 58.

Then, when a hydraulic pressure on the side of the slave cylinder 28 (the downstream side) reaches an upper limit holding hydraulic pressure HP, electric power is supplied to the solenoid valve 56 to close the solenoid valve 56, and simultaneously, supply of electric power to the motor 52 is stopped and generation of a hydraulic pressure is stopped. That is, while the upstream side is in a low pressure state since the hydraulic pressure has been released, the downstream side is maintained in a high pressure state (the upper limit holding hydraulic pressure HP). Accordingly, the clutch device 26 is maintained in an engaged state without generation of hydraulic pressure from the master cylinder 51, and electric power consumption can be minimized while enabling traveling of the motorcycle 1.

Here, depending on a gear shift operation, the clutch device 26 may be shifted immediately after inputting the hydraulic pressure. In this case, before the solenoid valve 56 is closed and the upstream side is in a low pressure state, the motor 52 is driven in a reverse direction while the solenoid valve 56 is open, a reservoir 51e is caused to communicate with the master cylinder 51 while the master cylinder 51 is decompressed, and a hydraulic pressure on the side of the clutch device 26 toward the master cylinder 51 is relieved. Here, driving of the clutch actuator 50 is feedback-controlled on the basis of a detected hydraulic pressure of the upstream-side hydraulic pressure sensor 57.

Even in a state in which the solenoid valve 56 is closed and the clutch device 26 is maintained in an engaged state, as shown in a region D in FIG. 5, a hydraulic pressure on the downstream side is gradually decreased (leaked). That is, a hydraulic pressure on the downstream side is gradually decreased due to causes such as a leakage of a hydraulic pressure or a decrease in temperature due to deformation or the like of seals of the solenoid valve 56 and the one-way valve 53c1.

Meanwhile, as shown in a region E in FIG. 5, a hydraulic pressure on the downstream side may be increased due to an increase in temperature or the like.

If there is fine hydraulic pressure fluctuation on the downstream side, the fine hydraulic pressure fluctuation can be absorbed by an accumulator (not shown), and it is not necessary to operate the motor 52 and the solenoid valve 56 every time when the hydraulic pressure fluctuates and to increase the electric power consumption.

As shown in the region E in FIG. 5, when a hydraulic pressure on the downstream side is increased to the upper limit holding hydraulic pressure HP, since supply of electric power to the solenoid valve 56 is decreased or the like, the solenoid valve 56 is brought into an open state in stages, and the hydraulic pressure on the downstream toward the upstream side is relieved.

As shown in a region F in FIG. 5, when a hydraulic pressure on the downstream side is decreased to the lower limit holding hydraulic pressure LP, the supply of electric power to the motor 52 is started while the solenoid valve 56 is closed, and a hydraulic pressure on the upstream side is increased. When the hydraulic pressure on the upstream side exceeds the hydraulic pressure on the downstream side, the hydraulic pressure is supplemented (restored) on the downstream side via the bypass oil path 53c and the one-way valve 53c1. When the hydraulic pressure on the downstream side approaches the upper limit holding hydraulic pressure HP, supply of electric power to the motor 52 is stopped and generation of the hydraulic pressure is stopped. Accordingly, the hydraulic pressure on the downstream side is maintained between the upper limit holding hydraulic pressure HP and the lower limit holding hydraulic pressure LP, and the clutch device 26 is maintained in an engaged state.

When the gearbox 21 is at a neutral position upon stoppage of the motorcycle 1, supply of electric power to the motor 52 and the solenoid valve 56 is also stopped. Accordingly, the master cylinder 51 stops generation of a hydraulic pressure and stops supply of a hydraulic pressure to the slave cylinder 28. The solenoid valve 56 is in an open state, and a hydraulic pressure in the downstream side oil path 53b is returned to the reservoir 51e. As described above, the slave cylinder 28 side (the downstream side) is in a state of having a pressure lower than the touch point hydraulic pressure TP, and the clutch device 26 is in a disengaged state. This state corresponds to regions G and H in FIG. 5.

In a state in which the gearbox 21 is at a neutral position upon stoppage of the motorcycle 1, supply of electric power to the motor 52 is blocked and in a stoppage state. For this reason, the hydraulic pressure is in a state close to 0.

Meanwhile, if the gearbox 21 is in an in-gear state upon stoppage of the motorcycle 1, a standby state in which a standby hydraulic pressure WP is applied toward the slave cylinder 28 is established.

The standby hydraulic pressure WP is a hydraulic pressure that is slightly lower than the touch point hydraulic pressure TP at which connection of the clutch device 26 starts, and a hydraulic pressure (a hydraulic pressure applied to the regions A and H in FIG. 5) at which the clutch device 26 is not connected. Invalid stroke filling of the clutch device 26 (canceling out of rattling of individual parts or canceling out of a reaction force of an operation, application of pre-compression to a hydraulic path, and so on) becomes possible due to application of the standby hydraulic pressure WP, and working responsiveness upon connection of the clutch device 26 is increased.

<Shift Control>

Next, shift control of the motorcycle 1 will be described.

In the motorcycle 1 of the embodiment, in a state in which a gear position of the gearbox 21 is in a 1st in-gear state and an in-gear stoppage state in which a vehicle speed is less than a set value corresponding to stoppage, a control of decreasing the standby hydraulic pressure WP supplied to the slave cylinder 28 is performed when a shift operation from a 1st gear to a neutral position is performed with respect to the shift pedal 32.

Here, when the motorcycle 1 is in a stoppage state and a gear position of the gearbox 21 is disposed at any variable gear position other than the neutral position, i.e., when the gearbox 21 is in an in-gear stoppage state, the preset standby hydraulic pressure WP is supplied to the slave cylinder 28.

The standby hydraulic pressure WP is normally set to a first set value P1 (see FIG. 5) that is a standard standby hydraulic pressure (in a case of a non-detection state in which a gear shift operation of the shift pedal 32 is not detected). Accordingly, the clutch device 26 is in a standby state in which the invalid stroke filling is performed, and responsiveness upon clutch engagement is increased. That is, when a driver increases a throttle opening angle and increases a rotational number of the engine 13, immediate engagement of the clutch device 26 is started due to supply of a hydraulic pressure to the slave cylinder 28, and rapid departure acceleration of the motorcycle 1 becomes possible.

The motorcycle 1 includes a shift operation detection switch 48 separately from the shift load sensor 73 in order to detect a shift operation of a driver with respect to the shift pedal 32.

Then, in the in-gear stoppage state, when the shift operation detection switch 48 detects a shift operation from a 1st gear to a neutral position, the hydraulic pressure controller 61 performs control of setting the standby hydraulic pressure WP to a second set value P2 (a low pressure standby hydraulic pressure, see FIG. 5) which is lower than the first set value P1 before a gear shift operation is performed.

When the gearbox 21 is in an in-gear state, since a standard standby hydraulic pressure corresponding to the first set value P1 is normally supplied to the slave cylinder 28, a slight, so-called, drag will occur in the clutch device 26. Here, a dog and a slot (a dog hole) meshing with each other in a dog clutch of the gearbox 21 press each other in a rotational direction, and a resistance in engagement release occurs and a shift operation may become heavy. In this case, when the standby hydraulic pressure WP supplied to the slave cylinder 28 is lowered to a low pressure standby hydraulic pressure corresponding to the second set value P2, engagement of the dog and the slot becomes easy to release, and a shift operation becomes light.

<Clutch Control Mode>

Figure 6:
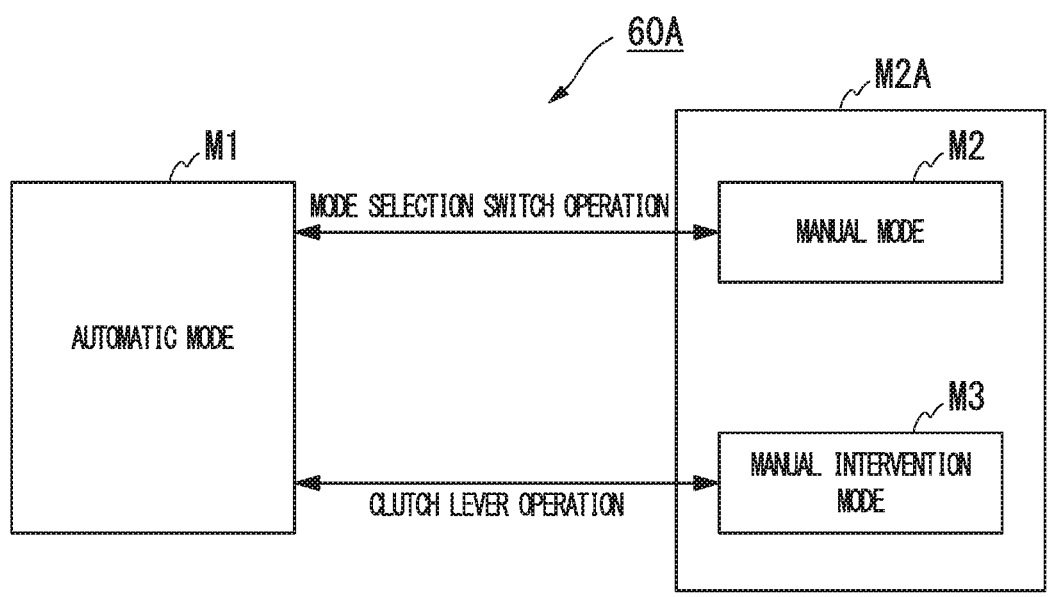
FIG. 6 is a view for explaining shifting of a clutch control mode according to the embodiment.

As shown in FIG. 6, a clutch control device 60A of the embodiment has clutch control modes of three types. The clutch control modes are appropriately shifted between the three types modes including an automatic mode M1 of performing automated control, a manual mode M2 of performing a manual operation and a manual intervention mode M3 of performing a temporary manual operation according to operations of a clutch control mode selection switch 59 (see FIG. 4) and the clutch lever 4b (see FIG. 1). Further, an object including the manual mode M2 and the manual intervention mode M3 is referred to as a manual system M2A.

The automatic mode M1 is a mode of controlling the clutch device 26 by calculating a clutch capacity appropriate for a traveling state through automatic departure and shift control. The manual mode M2 is a mode of controlling the clutch device 26 by calculating a clutch capacity according to a clutch operation instruction from an occupant. The manual intervention mode M3 is a temporary manual operation mode of controlling the clutch device 26 by receiving a clutch operation instruction from an occupant during the automatic mode M1 and calculating a clutch capacity from the clutch operation instruction. Further, when an occupant stops (completely releases) an operation of a clutch lever 4b during the manual intervention mode M3, it is set so that the mode returns to the automatic mode M1.

The clutch control device 60A of the embodiment drives the clutch actuator 50 (see FIG. 3) and generates a clutch control hydraulic pressure. For this reason, the clutch control device 60A starts control from a clutch-off state (a disconnection state) in the automatic mode M1 upon starting of the system. In addition, the clutch control device 60A is set to return to the clutch-off in the automatic mode M1 since a clutch operation is unnecessary upon stoppage of the engine 13.

In the embodiment, the clutch control device 60A constitutes a clutch control system together with the clutch lever 4b.

The automatic mode M1 is basically for performing clutch control automatically, and allows the motorcycle 1 to travel with no lever operation. In the automatic mode M1, a clutch capacity is controlled by a throttle opening angle, an engine rotational number, a vehicle speed and a shift sensor output. Accordingly, the motorcycle 1 can be started without engine stalling with only a throttle operation and can perform a gear shift with only a shift operation. However, there is a case in which the clutch device 26 is automatically disconnected during an extremely low speed equivalent to idling. In addition, in the automatic mode M1, it is shifted to the manual intervention mode M3 by grasping the clutch lever 4b, and it is possible to arbitrarily disconnect the clutch device 26.

Meanwhile, in the manual mode M2, a clutch capacity is controlled according to a lever operation by an occupant. The automatic mode M1 and the manual mode M2 can be switched between by operating the clutch control mode selection switch 59 (see FIG. 4) during stoppage. Further, the clutch control device 60A may include an indicator indicating that a lever operation is effective upon shifting to the manual system M2A (the manual mode M2 or the manual intervention mode M3).

The manual mode M2 is basically for performing clutch control manually, and a clutch hydraulic pressure can be controlled according to an actuation angle of the clutch lever 4b. Accordingly, it is possible to control disconnection and connection of the clutch device 26 according to an intention of an occupant, and it is possible to connect the clutch device 26 to drive the motorcycle even at an extremely low speed equivalent to idling. However, an engine stalling may occur depending on a lever operation, and automatic departure with a throttle operation only is also not possible. Further, even in the manual mode M2, clutch control automatically intervenes upon a shift operation.

While disconnection and connection of the clutch device 26 is performed automatically by the clutch actuator 50 in the automatic mode M1, it is possible to temporary intervene a manual operation during the automated control of the clutch device 26 by performing a manual clutch operation with respect to the clutch lever 4b (the manual intervention mode M3).

<Manual Clutch Operation>

As shown in FIG. 1, the clutch lever 4b serving as a clutch manual operator is attached to a base end side (an inner side in the vehicle width direction) of a left grip of the steering handle 4a. The clutch lever 4b functions as an operator configured to transmit a clutch operation requirement signal to the ECU 60 with no mechanical connection to the clutch device 26 using a cable, a hydraulic pressure, or the like. That is, the motorcycle 1 employs a clutch-by-wire system configured to electrically connect the clutch lever 4b and the clutch device 26.

Referring also to FIG. 4, a clutch lever operation amount sensor 4c configured to detect an operation amount (a pivot angle) of the clutch lever 4b is installed integrally with the clutch lever 4b. The clutch lever operation amount sensor 4c converts an operation amount of the clutch lever 4b into an electrical signal and outputs the converted electrical signal.

In a state in which an operation of the clutch lever 4b is effective (the manual system M2A), the ECU 60 drives the clutch actuator 50 based on the output of the clutch lever operation amount sensor 4c. Further, the clutch lever 4b and the clutch lever operation amount sensor 4c may be integrated with each other or may be separate from each other.

The motorcycle 1 includes the clutch control mode selection switch 59 configured to switch a control mode of a clutch operation. Under a predetermined condition, the clutch control mode selection switch 59 can arbitrarily perform switching between the automatic mode M1 of automatically performing clutch control and the manual mode M2 of manually performing clutch control according to an operation of the clutch lever 4b. For example, the clutch control mode selection switch 59 is installed on a handle switch attached to the steering handle 4a. Accordingly, an occupant can easily operate the clutch control mode selection switch 59 in normal driving.

<Control of Clutch Capacity>

The clutch control device 60A of the embodiment calculates a control target value of a clutch capacity (hereinafter, simply referred to as "a control target value"). The clutch control device 60A calculates an estimated engine torque by applying an engine rotational number and a throttle opening angle to the estimated engine torque map. Here, the estimated engine torque is an engine torque corresponding to the engine rotational number and the throttle opening angle, and calculated from the estimated engine torque map (see FIG. 8). For example, the estimated engine torque map is created on the basis of actually measured values of the engine rotational number and the throttle opening angle. The estimated engine torque map is previously stored in the storage 62 (see FIG. 4).

FIG. 8 shows an example of the estimated engine torque map according to the embodiment. In the map of FIG. 8, a vertical axis represents a throttle opening angle of t1 to t10 [%], and a horizontal axis represents an engine rotational number of r1 to r10 [rpm]. In the map of FIG. 8, q1 to q10 represent an estimated engine torque [Nm] (hereinafter, simply referred to as "a torque value"), and the case in which the torque value is negative (−) (a hatched portion in the map of FIG. 8) represents a speed reduction state (i.e., engine braking state).

As shown in FIG. 8, the estimated engine torque tends to increase as the throttle opening angle is increased. A region in a speed reduction state (a region in which a torque value is negative) tends to gradually widen as the engine rotational number is increased.

The ECU 60 calculates an estimated engine torque by applying the engine rotational number and the throttle opening angle to the estimated engine torque map. For example, in FIG. 8, when the engine rotational number is r5 and the throttle opening angle is t2, the estimated engine torque is calculated as −q4.

The clutch control device 60A causes the clutch device 26 to vary a slip clutch capacity according to the estimated engine torque. Here, the slip clutch capacity is a clutch capacity at which the clutch starts to slip. That is, the slip clutch capacity means a clutch capacity when the clutch starts to slide, not a clutch capacity when the clutch is connected.

The clutch control device 60A calculates a clutch differential rotational number that is a rotational number difference between upstream rotation and downstream rotation of the clutch device 26, and outputs different control target values according to the clutch differential rotational number.

Here, the upstream rotation of the clutch device 26 corresponds to an input rotation of the clutch device 26, and the downstream rotation of the clutch device 26 corresponds to an output rotation of the clutch device 26. That is, the clutch differential rotational number corresponds to a difference between the input rotation and the output rotation of the clutch device 26.

Here, the clutch differential rotational number uses a value obtained by subtracting a clutch upstream rotational number (a rotational number of the crankshaft 14) from a clutch downstream rotational number (a counter shaft rotational number of crankshaft conversion). A crankshaft converted counter shaft rotational number Xc is calculated by the following equation (1).

$$Xc = Rc \times Gr \times Pr \qquad (1)$$

In the above-mentioned equation (1), Rc represents a rotational number of the counter shaft 23, Gr represents a gear ratio (a speed reduction ratio from the main shaft 22 to the counter shaft 23), and Pr represents a primary ratio (a speed reduction ratio from the crankshaft 14 to the main shaft 22) (see FIG. 1 and FIG. 2).

The clutch control device 60A of the embodiment varies a timing when the clutch is slipped according to the clutch differential rotational number, the bank angle, the gear position, and so on, (states of the vehicle). The clutch control device 60A varies an upper limit of a clutch capacity according to the clutch differential rotational number, the bank angle, the gear position, and so on, (states of the vehicle).

Next, an example of processing performed by the ECU 60 upon control of the clutch capacity will be described with reference to the flowchart of FIG. 7. The control flow is repeatedly performed using a prescribed control period (1 to 10 msec) when the automatic mode M1 is selected.

Figure 7:
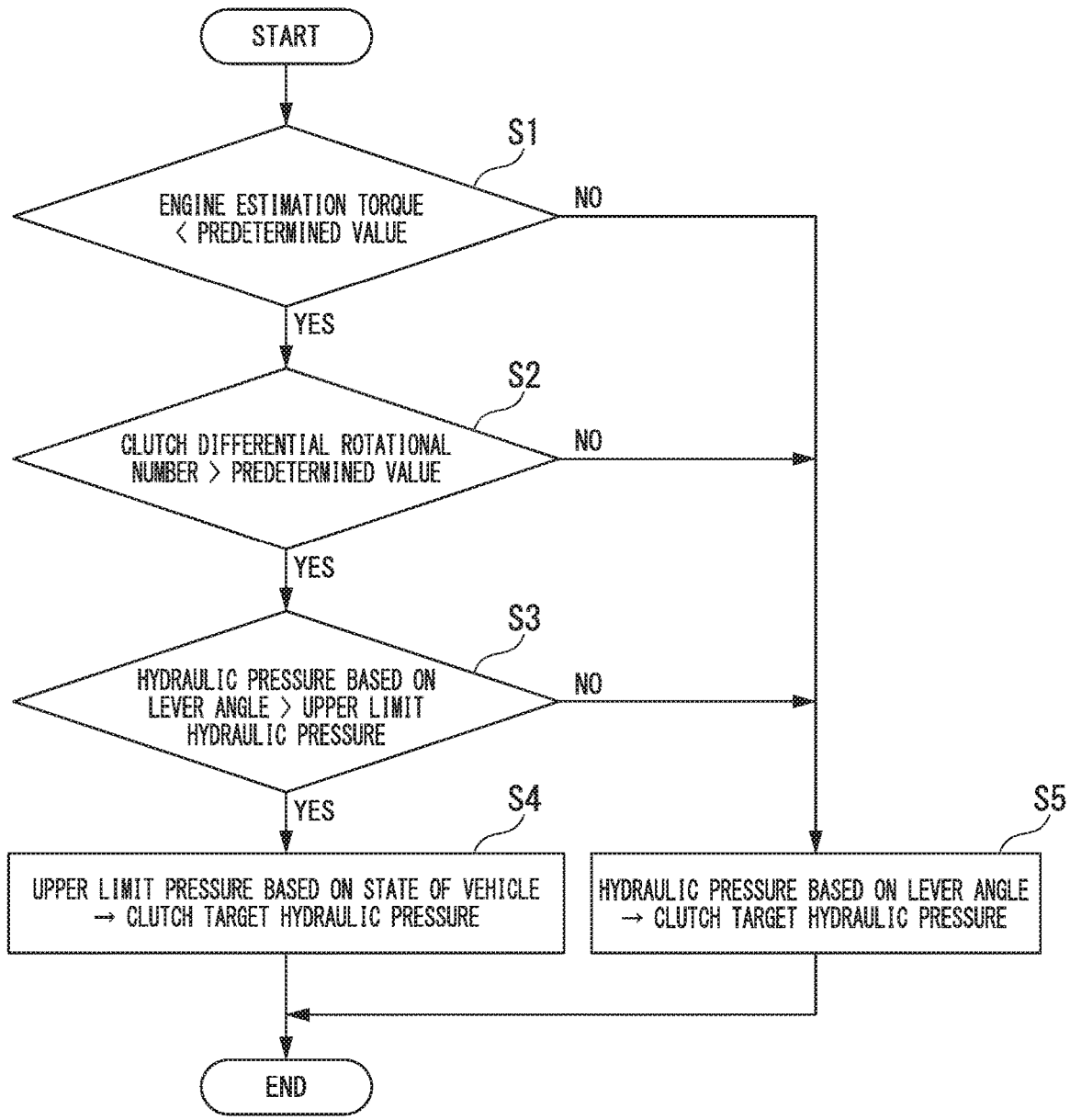
FIG. 7 is a flowchart showing control of a clutch capacity according to the embodiment.

As shown in FIG. 7, the ECU 60 determines whether the estimated engine torque is less than a predetermined value that has been previously determined (step S1). In step S1, the ECU 60 determines whether the estimated engine torque is smaller than a predetermined value (hereinafter, also referred to as "a torque threshold value"). For example, the torque threshold value may be set to 0 [Nm].

In the case of YES (the estimated engine torque is less than the predetermined value) in step S1, the processing transitions to step S2. In the embodiment, when the estimated engine torque is less than a torque threshold value (for example, 0 [Nm]) and the vehicle is in a speed reduction state (engine braking state), the processing transitions to step S2.

Meanwhile, in the case of NO (the estimated engine torque is the predetermined value or more) in step S1, the processing transitions to step S5.

In step S2, the ECU 60 determines whether the clutch differential rotational number exceeds a predetermined value (hereinafter, also referred to as "a rotational number threshold value"). For example, the rotational number threshold value is set to 300 [rpm].

In the case of YES (the clutch differential rotational number exceeds the predetermined value) in step S2, the processing transitions to step S3 or step S4. In the embodiment, when the clutch differential rotational number exceeds the rotational number threshold value (for example, 300 [rpm]) and the clutch downstream rotational number is larger than the clutch upstream rotational number, the processing transitions to step S3 or step S4. That is, in the case of the state in which the rotational number of the rear wheel is excessively increased and the engine braking is applied, the processing transitions to step S3 or step S4.

Meanwhile, in the case of NO (the clutch differential rotational number is the predetermined value or less) in step S2, the processing transitions to step S5.

In the embodiment, a manual operation can be intervened in an automated control of the clutch device 26. For example, upon intervention of the manual operation (when a driver intentionally adjusts a clutch capacity), the processing transitions to step S3.

Meanwhile, when the ECU 60 performs control of the clutch capacity with no intervention of the manual operation, the processing transitions to step S4.

In step S3, the ECU 60 determines whether the hydraulic pressure based on the lever angle exceeds a preset upper limit hydraulic pressure (hereinafter, also referred to as "a hydraulic pressure threshold value"). For example, the hydraulic pressure threshold value is set to 500 [kPa].

Here, the hydraulic pressure based on the lever angle is a hydraulic pressure calculated on the basis of an operation amount (a clutch lever angle) of the clutch lever 4b.

The upper limit hydraulic pressure is a hydraulic pressure at which it can be determined that the clutch device 26 is connected (a torque is transmitted). Further, the upper limit hydraulic pressure corresponds to a hydraulic pressure (an upper limit value of a clutch capacity) immediately before (immediately before a slippage occurs) a hydraulic pressure at which an action of a back torque limiter (hereinafter, also referred to as "a slipper"), which is configured to automatically restrict a torque (a back torque) transmitted from the rear wheel in order to inhibit a slippage of the rear wheel due to the engine braking, is generated.

In the case of YES (the hydraulic pressure based on the lever angle exceeds the upper limit hydraulic pressure) in step S3, the processing transitions to step S4. In the embodiment, in the case in which the hydraulic pressure based on the lever angle exceeds the hydraulic pressure threshold value (for example, 500 [kPa]) and slipper control by the ECU 60 is needed, the processing transitions to step S4. That is, when the engine torque and the clutch differential rotational number satisfy a predetermined condition (YES in step S1 and YES in step S2), in the case in which the hydraulic pressure based on the lever angle exceeds the upper limit hydraulic pressure (in the case of YES in step S3), the clutch capacity designated by the ECU 60 is preferentially output.

Meanwhile, in the case of NO (the hydraulic pressure based on the lever angle is the upper limit hydraulic pressure or less) in step S3, the processing transitions to step S5.

The upper limit hydraulic pressure has a plurality of set values according to states of the vehicle. The upper limit hydraulic pressure is set on the basis of elements of the clutch differential rotational number, the bank angle and the gear position, and the control target value map (see FIG. 9A, FIG. 9B and FIG. 9C). The control target value map is a map related to the clutch differential rotational number, the bank angle, the gear position, and so on (states of the vehicle). The control target value map is previously stored in the storage 62 (see FIG. 4).

FIG. 9A, FIG. 9B and FIG. 9C show examples of the control target value maps according to the embodiment. FIG. 9A shows an example in a LOW gear, FIG. 9B shows an example in a MID gear, and FIG. 9C shows an example in a HIGH gear. In the maps of FIG. 9A to FIG. 9C, a vertical axis represents a bank angle of b1 to b8 [°] and a horizontal axis represents a clutch differential rotational number of v1 to v4 [rpm]. In the maps of FIG. 9A to FIG. 9C, the upper limit hydraulic pressure is represented as three stages of "high," "middle" and "low" as "the upper limit hydraulic pressure: high" (a thick hatched portion) when the upper limit hydraulic pressure is relatively high, "the upper limit hydraulic pressure: low" (no hatching, a white portion) when the upper limit hydraulic pressure is relatively low, and "the upper limit hydraulic pressure: middle" (a thin hatched portion) when the upper limit hydraulic pressure is intermediate.

As shown in FIG. 9A to FIG. 9C, the upper limit hydraulic pressure tends to decrease as the bank angle is increased. A region of "the upper limit hydraulic pressure: high" (a region in which the upper limit hydraulic pressure is relatively high) tends to gradually widen as the gear becomes a HIGH gear.

In step S4, the ECU 60 sets an upper limit hydraulic pressure (a clutch capacity) on the basis of the states of the vehicle as a clutch target hydraulic pressure. The ECU 60 outputs the clutch target hydraulic pressure that differs according to the states of the vehicle as the control target value.

In the embodiment, the ECU 60 outputs the control target value that differs according to the clutch differential rotational number, the bank angle and the gear position. The ECU 60 outputs the control target value on the basis of the clutch differential rotational number, the bank angle and the gear position, and the control target value map.

As an example, the case in which the bank angle and the clutch differential rotational number are in the same condition (when only a gear position differs) will be exemplarily described.

For example, upon the LOW gear in FIG. 9A, when the bank angle is b3 and the clutch differential rotational number is v3, "the upper limit hydraulic pressure: low" is set as the clutch target hydraulic pressure.

For example, upon the MID gear in FIG. 9B, when the bank angle is b3 and the clutch differential rotational number is v3, "the upper limit hydraulic pressure: middle" is set as the clutch target hydraulic pressure.

For example, upon the HIGH gear in FIG. 9C, when the bank angle is b3 and the clutch differential rotational number is v3, "the upper limit hydraulic pressure: high" is set as the clutch target hydraulic pressure.

The upper limit hydraulic pressure has a plurality of set values according to a traveling mode of the vehicle. For example, the traveling mode includes "a high speed mode"

in which a vehicle speed is relatively high, "a low speed mode" in which the vehicle speed is relatively low, and "a normal mode" in which the vehicle speed is middle. The ECU 60 may output the control target value that differs according to the traveling mode. The ECU 60 may output the control target value on the basis of the traveling mode and the control target value map.

In step S5, the hydraulic pressure based on the lever angle is set as the clutch target hydraulic pressure. That is, the clutch capacity is controlled according to a lever operation by an occupant.

Figure 10:
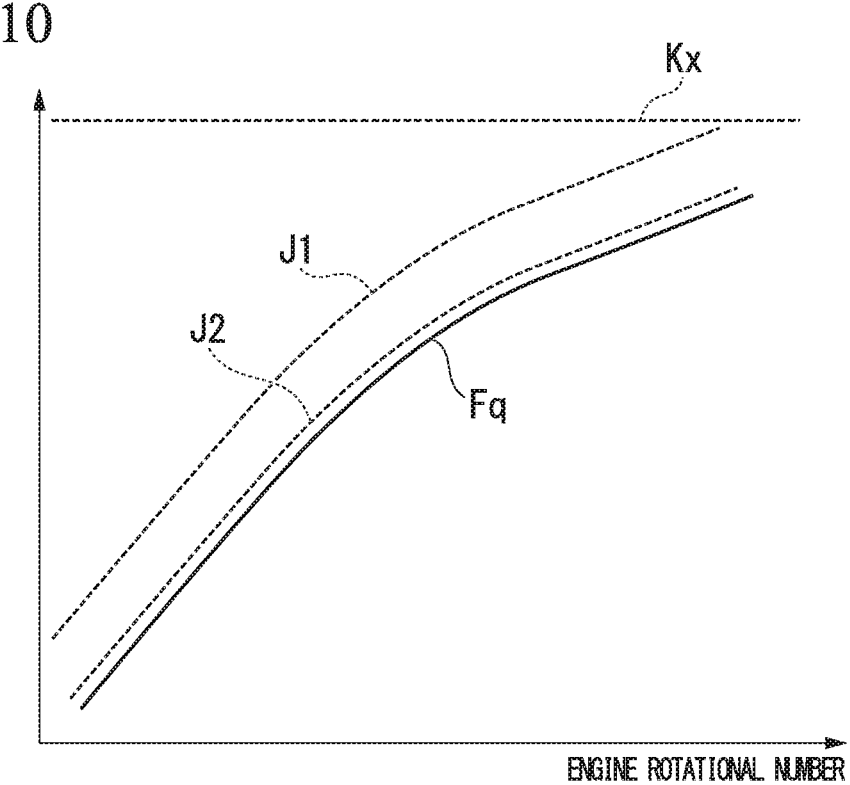
FIG. 10 is a view for explaining an example of setting of an upper limit hydraulic pressure according to the embodiment.

FIG. 10 is a view for explaining an example of setting of the upper limit hydraulic pressure according to the embodiment. In FIG. 10, a horizontal axis represents an engine rotational number. In FIG. 10, reference numeral Fq represents an engine friction torque and reference numeral Kx represents a clutch capacity of a mechanical type slipper clutch.

As shown in FIG. 10, the engine friction torque Fq tends to increase as the engine rotational number is increased. Meanwhile, the clutch capacity Kx of the mechanical type slipper clutch has a constant value regardless of an increase or a decrease in the engine rotational number.

In the embodiment, the ECU 60 sets an upper limit hydraulic pressure J1 (a clutch capacity) calculated on the basis of the estimated engine torque map as the clutch target hydraulic pressure. The upper limit hydraulic pressure J1 (hereinafter, also referred to as "a first upper limit value J1") set on the basis of the estimated engine torque map is set along an inclination of the engine friction torque Fq. The first upper limit value J1 is set as a value that is larger than the engine friction torque Fq and smaller than the clutch capacity Kx of the mechanical type slipper clutch (Fq<J1<Kx).

The ECU 60 adjusts the upper limit hydraulic pressure according to the states of the vehicle (the clutch differential rotational number, the bank angle, the gear position, and so on) after the first upper limit value J1 is set to the vicinity of the engine friction torque Fq. In the embodiment, the ECU 60 sets an upper limit hydraulic pressure J2 (a clutch capacity) calculated according to the state of the vehicle on the basis of the first upper limit value J1 as the clutch target hydraulic pressure. The upper limit hydraulic pressure J2 (hereinafter, also referred to as "a second upper limit value J2") calculated according to the state of the vehicle is set along the inclination of the engine friction torque Fq. In the embodiment, the second upper limit value J2 is set to a value that is larger than the engine friction torque Fq and smaller than the first upper limit value J1 (Fq<J2<J1). In the embodiment, after the first upper limit value J1 is set to the vicinity of the engine friction torque Fq, according to the state of the vehicle, the second upper limit value J2 is set between the engine friction torque Fq and the first upper limit value J1.

Figure 11:
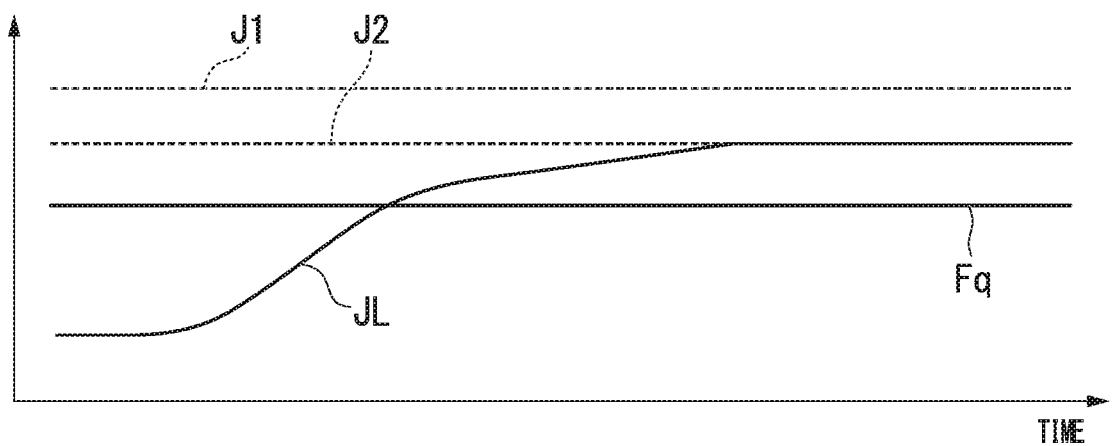
FIG. 11 is a view for explaining an example of control of a clutch capacity including a clutch lever operation according to the embodiment.

FIG. 11 is a view for explaining an example of control of a clutch capacity including a clutch lever operation according to the embodiment. In FIG. 11, a horizontal axis represents a time. In FIG. 11, reference numeral Fq represents an engine friction torque, reference numeral J1 represents a first upper limit value, reference numeral J2 represents a second upper limit value, and reference numeral JL represents a target value of a hydraulic pressure output from the ECU 60.

As shown in FIG. 11, when the target value of the hydraulic pressure on the basis of the lever angle is the second upper limit value J2 or less, the target value of the hydraulic pressure on the basis of the lever operation angle is output. When the target value of the hydraulic pressure on the basis of the lever angle exceeds the second upper limit value J2, the target value of the hydraulic pressure of the second upper limit value J2 is output.

In the embodiment, when the target value of hydraulic pressure on the basis of the lever angle is the first upper limit value J1 or less in the case in which the first upper limit value J1 is set as the clutch target value, the ECU 60 controls the clutch capacity depending on the lever operation by the occupant. Meanwhile, the ECU 60 outputs the clutch capacity calculated on the basis of the estimated engine torque map when the target value of the hydraulic pressure based on the lever angle exceeds the first upper limit value J1.

In the embodiment, when the target value of the hydraulic pressure on the basis of the lever angle is the second upper limit value J2 or less in the case in which the second upper limit value J2 is set as the clutch target value, the ECU 60 controls the clutch capacity depending on the lever operation by the occupant. Meanwhile, the ECU 60 outputs the clutch capacity calculated according to the states of the vehicle (the clutch differential rotational number, the bank angle, the gear position, and so on) when the target value of the hydraulic pressure based on the lever angle exceeds the second upper limit value J2.

As described above, the embodiment is the clutch control device 60A including the engine 13, the gearbox 21, the clutch device 26 configured to disconnect and connect power transmission between the engine 13 and the gearbox 21, the clutch actuator 50 configured to drive the clutch device 26 and vary a clutch capacity, the engine rotational number sensor 76 configured to detect an engine rotational number, the throttle opening angle sensor 74 configured to detect a throttle opening angle, and the ECU 60 configured to calculate a control target value of a clutch capacity, wherein the ECU 60 calculates an estimated engine torque and causes the clutch device 26 to vary a slip clutch capacity according to the estimated engine torque.

According to the configuration, the ECU 60 calculates an estimated engine torque and causes the clutch device 26 to change the slip clutch capacity according to the estimated engine torque, since the clutch capacity at which the clutch starts to slip can be freely varied according to the estimated engine, an optimal clutch capacity can be output.

In addition, in the embodiment, since the ECU 60 sets the clutch capacity according to the state of the vehicle as the control target value when the estimated engine torque is less than the predetermined value, the timing when the optimal clutch capacity is output can be restricted to when the estimated engine torque is less than the predetermined.

In addition, in the embodiment, since the ECU 60 sets the clutch capacity according to the state of the vehicle as the control target value when the clutch differential rotational number exceeds the predetermined value, the timing when the optimal clutch capacity is output can be restricted to the case in which the clutch differential rotational number exceeds the predetermined value.

In addition, in the embodiment, since the ECU 60 can freely vary the clutch capacity according to the clutch differential rotational number by calculating the clutch differential rotational number and outputting the control target value that differs according to the clutch differential rotational number, an optimal clutch capacity can be output.

In addition, in the embodiment, as the ECU 60 outputs the control target value that differs according to the bank angle, since the clutch capacity can be freely varied according to a magnitude of the bank angle, an optimal clutch capacity can be output.

In addition, in the embodiment, as the ECU 60 outputs the control target value that differs according to the gear position, since the clutch capacity can be freely varied according to the gear position, an optimal clutch capacity can be output.

In addition, in the embodiment, as the ECU 60 outputs the control target value on the basis of the clutch differential rotational number and the control target value map, since the control target value (the control target value according to the clutch differential rotational number) preset in the control target value map can be used as the clutch capacity, an optimal clutch capacity can be more stably output.

In addition, in the embodiment, as the ECU 60 outputs the control target value on the basis of the bank angle and the control target value map, the control target value (the control target value according to the bank angle) preset in the control target value map can be used as the clutch capacity, and an optimal clutch capacity can be more stably output.

In addition, in the embodiment, as the ECU 60 outputs the control target value based on the gear position and the control target value map, since the control target value (the control target value according to the gear position) preset in the control target value map can be used as the clutch capacity, an optimal clutch capacity can be more easily output.

In addition, in the embodiment, in the case in which the clutch capacity according to the operation amount exceeds the predetermined value when the engine torque and the clutch differential rotational number satisfy a predetermined condition, as the clutch capacity designated by the ECU 60 is output preferentially, even though intervention of the manual clutch operation by the clutch lever 4b is possible, an optimal clutch capacity can be output by the ECU 60.

For example, as shown in FIG. 10, since the clutch capacity Kx of the mechanical type slipper clutch has a constant value regardless of an increase or decrease in the engine rotational number, when the engine rotational number with respect to the vehicle speed is low, a difference between the friction torque of the engine and the torque transmitted from the rear wheel through the clutch is increased. As a result, as the engine rotational number is increased according to the vehicle speed, the friction torque of the engine increases and the vehicle speed reduces. That is, since the sudden engine braking is generated abruptly, the rear wheel may slip or float.

On the other hand, according to the embodiment, the clutch capacity at which the clutch starts to slip can be freely varied according to the estimated engine torque by calculating the estimated engine torque and changing the slip clutch capacity according to the estimated engine torque. That is, according to the embodiment, since a difference between the friction torque of the engine and the torque transmitted from the rear wheel through the clutch can be constantly maintained, the rear wheel can be prevented from sliding or floating without generating the sudden engine braking abruptly.

In addition, since the clutch capacity is changed according to the state of the vehicle (the clutch differential rotational number, the bank angle, the gear position, and so on), even when the clutch is connected while the vehicle is inclined, impairment of the stability of the rear wheel with respect to the ground can be prevented without excessive effectiveness of the engine braking being generated.

Further, the present invention is not limited to the embodiment, and for example, the present invention may be applied to a configuration in which a clutch is disconnected by increasing a hydraulic pressure and the clutch is connected by decreasing a hydraulic pressure, in addition to a configuration in which a clutch is connected by increasing a hydraulic pressure and the clutch is disconnected by decreasing the hydraulic pressure.

The clutch operator is not limited to a clutch lever and may be a clutch pedal or other various operators.

The present invention is not limited to a saddle riding vehicle in which a clutch operation is automated like the embodiment and may also be applied to a saddle riding vehicle including a so-called transmission with no clutch operation configured to adjust a driving force and shift gears without performing a manual clutch operation under a predetermined condition while setting the manual clutch operation as a basic operation.

In addition, all vehicles on which a driver rides on the vehicle body are included as the saddle riding vehicle, and in addition to a motorcycle (including a motorized bicycle and a scooter-type vehicle), a three-wheeled vehicle (including a two-front-wheeled and one-rear-wheeled vehicle in addition to a one-front-wheeled and two-rear-wheeled vehicle) or a four-wheeled vehicle are also included, and a vehicle in which an electric motor is included in a prime mover is also included.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A clutch control device comprising:
an engine;
a gearbox;
a clutch device configured to disconnect and connect power transmission between the engine and the gearbox;
a clutch actuator configured to drive the clutch device and vary a clutch capacity;
an engine rotational number sensor configured to detect an engine rotational number;
a throttle opening angle sensor configured to detect a throttle opening angle;
a controller configured to calculate a control target value of the clutch capacity; and
a bank angle sensor configured to detect a bank angle,
wherein the controller calculates an estimated engine torque and causes the clutch device to change a slip clutch capacity according to the estimated engine torque, and
wherein the controller outputs the control target value that differs according to the bank angle.

2. The clutch control device according to claim 1,
wherein the controller sets the clutch capacity according to a state of a vehicle as the control target value when the estimated engine torque is less than a predetermined value.

3. The clutch control device according to claim 1,
wherein the controller sets the clutch capacity according to a state of a vehicle as the control target value when a clutch differential rotational number, which is a rotational number difference between upstream rotation and downstream rotation of the clutch device, exceeds a predetermined value.

4. The clutch control device according to claim 1,
wherein the controller calculates a clutch differential rotational number which is a rotational number difference between upstream rotation and downstream rotation of the clutch device, and outputs the control target value that differs according to the clutch differential rotational number.

5. The clutch control device according to claim 4, further comprising: a storage that stores a control target value map in which the control target value that differs according to the clutch differential rotational number is set,
wherein the controller outputs the control target value on the basis of the clutch differential rotational number and the control target value map.

6. The clutch control device according to claim 1, further comprising a gear position sensor configured to detect a gear position,
wherein the controller outputs the control target value that differs according to the gear position.

7. The clutch control device according to claim 6, further comprising a storage that stores a control target value map in which the control target value that differs according to the gear position is set,
wherein the controller outputs the control target value on the basis of the gear position and the control target value map.

8. The clutch control device according to claim 1, further comprising a storage that stores a control target value map in which the control target value that differs according to the bank angle is set,
wherein the controller outputs the control target value on the basis of the bank angle and the control target value map.

9. A clutch control system comprising:
the clutch control device according to claim 1; and
a clutch operator configured to manually operate the clutch device,
the clutch control system being switchable between to generate the clutch capacity according to an operation amount of the clutch operator and to designate a clutch capacity by using the controller,
wherein, when an engine torque and a clutch differential rotational number, which is a rotational number difference between upstream rotation and downstream rotation of the clutch device, satisfy a predetermined condition, in a case in which a clutch capacity according to the operation amount exceeds a predetermined value, the clutch capacity designated by the controller is output.

* * * * *